US012601313B2

(12) United States Patent
Weinreb et al.

(10) Patent No.: US 12,601,313 B2
(45) Date of Patent: Apr. 14, 2026

(54) SYSTEMS AND METHODS FOR ROCKET PROPULSION INCLUDING ROCKET MOTOR USING POWDER MONOPROPELLANT

(71) Applicant: POWDER FUELS LTD,
Tel-Aviv-Yafo (IL)

(72) Inventors: Abraham Weinreb, Tel Aviv (IL);
Menahem Kidron, Kiryat (IL); **Shmuel
Kenig, Haifa (IL); Naum Naveh**,
Ra'anana (IL)

(73) Assignee: POWDER FUELS LTD,
Tel-Aviv-Yafo (IL)

( * ) Notice: Subject to any disclaimer, the term of this
patent is extended or adjusted under 35
U.S.C. 154(b) by 0 days.

(21) Appl. No.: 18/855,753

(22) PCT Filed: Apr. 24, 2023

(86) PCT No.: PCT/IL2023/050417
§ 371 (c)(1),
(2) Date: Oct. 10, 2024

(87) PCT Pub. No.: WO2023/209707
PCT Pub. Date: Nov. 2, 2023

(65) Prior Publication Data
US 2025/0243828 A1 Jul. 31, 2025

(30) Foreign Application Priority Data
Apr. 26, 2022 (IL) .......................................... 292537

(51) Int. Cl.
F02K 9/70 (2006.01)
F02K 9/34 (2006.01)
F02K 9/95 (2006.01)

(52) U.S. Cl.
CPC .................. F02K 9/70 (2013.01); F02K 9/34
(2013.01); F02K 9/95 (2013.01)

(58) Field of Classification Search
CPC ..... F02K 9/95; F02K 9/34; F02K 9/70; F02K
9/72; F02K 9/08
See application file for complete search history.

(56) References Cited

U.S. PATENT DOCUMENTS 2,957,307 A 10/1960 Brandenberger et al.
3,158,994 A * 12/1964 Hodgson ................. C06B 27/00
60/260
(Continued)

FOREIGN PATENT DOCUMENTS

BR 102022017334 A2 * 3/2024 ............. C06B 29/02
CN 113944568 A * 1/2022
(Continued)

OTHER PUBLICATIONS

Heywood, J.B., "Internal Combustion Engine Fundamentals." McGraw-
Hill Series in Mechanical Engineering, 1988, Chapter 1, pp. 1-17,
United States.
(Continued)

*Primary Examiner* — Craig Kim
(74) *Attorney, Agent, or Firm* — SALIWANCHIK,
LLOYD & EISENSCHENK

(57) ABSTRACT

A system for generating hot, high-pressure exhaust gas for
thrust includes an energetic powder monopropellant,
wherein each particle of powder is comprised of a combi-
nation of oxidizer and fuel in a ratio suitable for combustion;
and a rocket motor for combusting the monopropellant, said
rocket motor comprising a container for storing the mono-
propellant, and a unitary feeder-combustor, wherein the
unitary feeder-combustor is configured to feed the powder
monopropellant from the container and to combust the
powder monopropellant therein without consumption of air,
(Continued)

thereby generating hot, high-pressure exhaust gas, generating thrust.

15 Claims, 5 Drawing Sheets

(56)                    References Cited

U.S. PATENT DOCUMENTS

| 3,258,917 | A | * | 7/1966 | Sargent | C06B 23/001 |
| | | | | | 60/39.47 |
| 3,328,963 | A | * | 7/1967 | Kraus | F42B 10/661 |
| | | | | | 60/39.47 |
| 3,388,554 | A | * | 6/1968 | Hodgson | F02K 9/70 |
| | | | | | 149/19.91 |
| 3,507,719 | A | * | 4/1970 | Hodgson | F02K 9/70 |
| | | | | | 149/19.8 |
| 3,730,909 | A | * | 5/1973 | Armstrong et al. | C06D 5/04 |
| | | | | | 60/218 |
| 10,501,385 | B1 | * | 12/2019 | Buckner | F02K 9/08 |

| 2013/0025566 | A1 | | 1/2013 | Thomassin et al. | |
| 2013/0028768 | A1 | | 1/2013 | Fontaine et al. | |
| 2018/0282240 | A1 | * | 10/2018 | Jain | C06B 25/34 |
| 2019/0300453 | A1 | * | 10/2019 | Kim | C06B 21/0008 |
| 2020/0232772 | A1 | * | 7/2020 | Coffey | F42B 5/16 |
| 2024/0150257 | A1 | * | 5/2024 | Moden | C06B 43/00 |

FOREIGN PATENT DOCUMENTS

| DE | 10141108 | B4 | * | 6/2005 | F02K 9/48 |
| RU | 2258893 | C1 | * | 8/2005 | |

OTHER PUBLICATIONS

"Rotary Airlock Valve: Engineering Guide (Design, Calculation)" <<downloaded Oct. 20, 2025, https://powderprocess.net/ Equipments html/Airlock_Rotary_Valve.html>>.
"Rotary Airlock Valves and How They Work." Streamline Industries, May 9, 2019, <<https://streamlineind.com/rotary-airlock-valves-and-how-they-work/>>.

* cited by examiner

100

101 102 103 104 105 106

SYSTEMS AND METHODS FOR ROCKET PROPULSION INCLUDING ROCKET MOTOR USING POWDER MONOPROPELLANT

RELATED APPLICATIONS

This application is a National Stage of International Application No. PCT/IL2023/050417, filed Apr. 24, 2023; which claims the benefit of priority to Israeli Patent Application Serial No. 292537, filed Apr. 26, 2022, entitled "Rocket Motor Using Powder Monopropellant," the contents of which are incorporated by reference as if fully set forth herein.

FIELD OF THE INVENTION

The present disclosure, in some embodiments, concerns systems and methods for rocket propulsion, including a rocket motor using a powder monopropellant comprised of energetic particles, in which the combustion takes place in a powder-fed feeder-combustor which is separate from the container that houses the powder monopropellant.

BACKGROUND OF THE INVENTION

Existing rocket motors that are configured to operate without air are of two types: liquid propellant and solid propellant.

A liquid propellant rocket motor (LPRM) includes separate fuel tanks (containers) for the (liquid) fuel and the (liquid) oxidizer. Separate pumps carry the liquid fuel and the liquid oxidizer to a combustion chamber, where the two liquids are mixed, vaporized and burned. The combustion results in hot exhaust emitted at high pressure, which propels the rocket.

LPRMs must overcome various technical challenges. First, typically, the liquid fuel is hydrogen or methane, and the oxidizer is oxygen. These materials are gaseous at room temperature. For volumetric efficiency, the materials must be cooled to cryogenic temperatures, in order to be liquefied. In addition, to preserve their liquid states, the tanks themselves need to be thermally insulated and withstand the pressure of evaporation of the fuel and oxidizer. These requirements lead to the tanks being heavy and complicated. Additionally, due to inevitable evaporation, and safety requirements, the fuel and oxidizer must be loaded into the rockets just prior to launch, and must be topped off continuously. Third, in order to feed the fuel and oxidizer into the combustion chamber, high pressure, and high flow-capacity pumps are needed.

A solid composite propellant rocket motor (SPRM) includes a homogeneous mixture of a fuel (such as hydroxyl-terminated polybutadiene (HTPB)), oxidizer (such as ammonium perchlorate (AP)) and other additives. The propellant is cast into the casing with an inner shaped void around the longitudinal center axis of symmetry of the casing (cylindrical, star shaped etc.) in the center of the propellant. Combustion takes place at the outer surface of the void, and generates high pressure hot exhaust gases.

SPRMs must also overcome various challenges, which are different from those of LPRMs. First, the casing must be extremely strong to withstand the high pressures of the combustion. The casing must also include thermal insulation at its interface with the propellant, to prevent melting and perforation of the casing. The added mass and insulation reduce the propellant mass ratio of the SPRM. Second, as solid rocket propellant is energetic and sensitive, the propellant must be prepared in an extremely rigorous and time-intensive manner. Additionally, as even a small crack or fissure causes uncontrolled combustion of the SPRM, extensive and costly quality assurance testing, including NDT (non-destructive testing), are required. Once a SPRM is produced, it is impossible to modify any characteristic thereof. Any change in the design, to adapt it to a different mission or application, requires a redesign of the propellant's characteristics and the design of the SPRM's physical configuration. Moreover, continuous throttle-ability (the ability to control the thrust generated by the SPRM) is practically impossible. Finally, for large motors (high mass and volume), the propellant has to be mixed and prepared in multiple number of batches and cast in a precise timing, one level on top of the other (including curing of the propellant). This is a long process, which is complicated and very sensitive. For even larger motors, the casing and the propellant have to be segmented. Each segment must be produced separately, and all the segments must be assembled. The assembly of these segments is a complicated and sensitive process. In general, the production infrastructure required for SPRMs, including the mixers, the casting and curing facilities, and the testing facilities etc., are custom, large, very expensive, and limited in capacity. Also, once a comparatively large SPRM finishes its very long production process, the logistics of moving it to the storage and/or launch sites is extremely challenging, due to its large size and weight.

SUMMARY OF THE INVENTION

The present disclosure provides a new paradigm for rocket motors. The novel rocket motor is powered not by a liquid or solid propellant as described above, but rather by a powder monopropellant. The powder monopropellant is comprised of micro or nano sized particles, each being a composite of fuel and oxidizer in itself, at stoichiometric or close to stoichiometric ratios. This paradigm will be referred to herein as the Nano Powder Rocket Motor (NPRM).

The present disclosure further describes a system for generating hot, high-pressure exhaust for propulsion of a rocket motor, including a powder monopropellant and a rocket motor that is particularly suited for combusting a powder monopropellant. The NPRM rocket motor includes a container for storing the powder monopropellant, and a separate combustor for combustion of the monopropellant. In some embodiments, the combustor is a combination of a feeder and a combustor, in which the feeder feeds the powder into the combustor, where the combustion takes place. In particularly advantageous embodiments, the combustor is a unitary feeder-combustor that sucks the powder monopropellant from the container and combusts the powder monopropellant therein.

The disclosed NPRM has numerous advantages over existing LPRM and SPRM.

Compared to a SPRM, the energy per unit mass of the monopropellant powder is similar or better than that of conventional solid rocket motor propellants. Since the powder monopropellant is stored in a separate container and not inside the SPRM casing where the combustion takes place, there is no need to thermally insulate the storage container, nor to have it withstand the high pressures resulting from the combustion. The container may thus be lighter weight, and the propellant mass fraction of the motor is thus significantly better than that of a typical SPRM. Furthermore, the powder monopropellant enables continuous thrust control (for example, through control of the amount of monopropellant powder fed into the feeder-combustor), easy start and stop operation, and the ability to conduct repeated performance testing over its lifetime.

As compared to a LPRM, the powder monopropellant is stable at a wide range of temperatures, including room temperature, and therefore does not need to be stored cryogenically. The motor also does not need two separate, cryogenic temperature pumps in order to convey the propellant to the combustor, but rather a single, non-cryogenic feeder. Specifically, the unitary feeder-combustor embodiment is simpler and more efficient, since a vacuum is sufficient to draw the powder monopropellant into the feeder-combustor. Similarly, the NPRM avoids the safety and logistical complications resulting from the essential necessity of fueling the LPRM on the launch pad. Moreover, the fact that each particle of the powder monopropellant is composed of both the fuel and the oxidizer renders the process of mixing the fuel and the oxidizer in a combustion chamber unnecessary. This simplifies the combustion process as well as the structure of the feeder-combustor. In particular, the intake of the feeder-combustor is simpler than the turbomachinery required to pump liquid fuel and liquid oxidizer separately into combustion chambers of the LPRM. Finally, the disclosed motor has a much higher volumetric efficiency than a typical LPRM, reducing launch vehicle drag during ascent through the atmosphere.

According to a first aspect, a system for generating hot, high-pressure exhaust gas for thrust is disclosed. The system includes an energetic powder monopropellant, wherein each particle of powder is comprised of a combination of oxidizer and fuel in a ratio suitable for combustion; and a rocket motor for combusting the monopropellant, said rocket motor comprising a container for storing the monopropellant, and a unitary feeder-combustor, wherein the unitary feeder-combustor is configured to feed the powder monopropellant from the container and to combust the powder monopropellant therein without consumption of air, thereby generating hot, high-pressure exhaust gas, generating thrust.

In another implementation according to the first aspect, the unitary feeder-combustor sucks the powder monopropellant from the container with a vacuum.

In another implementation according to the first aspect, the unitary feeder-combustor is a TriPort feeder-combustor, wherein rotation of a rotor within a stator housing cyclically sucks in powder monopropellant into the unitary feeder-combustor from a first port, exposes the powder monopropellant to an ignition source within the unitary feeder-combustor to thereby ignite the powder monopropellant, and outputs the hot, high-pressure exhaust gas from the unitary feeder-combustor through second and third ports.

Optionally, a magnitude of thrust generated by the rocket motor is controllable by either control of a quantity of the powder monopropellant introduced into the unitary feeder-combustor, or by controlling a rotation rate of the rotor, or by both.

In another implementation according to the first aspect, said rocket motor is configured to use a portion of energy generated by combustion of the powder monopropellant to power at least one of the functions of the rocket motor.

In another implementation according to the first aspect, the system further includes a plurality of separate unitary feeder-combustors, drawing the powder monopropellant from the same container.

In another implementation according to the first aspect, each particle of the powder monopropellant is comprised of graphene oxide or a derivative thereof as the fuel, and ammonium perchlorate as the oxidizer.

Optionally, the powder monopropellant is a nanocomposite bilayer comprised of nano-scale graphene oxide coated around micro-scale particles of the ammonium perchlorate.

According to a second aspect, a method of generating hot, high-pressure gas exhaust from a rocket motor to thereby generate thrust is disclosed. The method includes: introducing powder monopropellant particles into a container, the powder monopropellant particles each comprising a combination of oxidizer and fuel in a ratio suitable for combustion; moving the powder monopropellant from the container into a unitary feeder-combustor; and combusting the powder monopropellant within the unitary feeder-combustor without consumption of air, thereby generating hot, high-pressure, exhaust gas, generating thrust.

In another implementation according to the second aspect, the moving step includes sucking the powder monopropellant from the container into the unitary feeder-combustor with a vacuum.

In another implementation according to the second aspect, the unitary feeder-combustor is a TriPort feeder-combustor, wherein rotation of a rotor within a stator housing cyclically sucks in powder monopropellant into the unitary feeder-combustor from a first port, exposes the powder monopropellant to an ignition source within the unitary feeder-combustor to thereby ignite the powder monopropellant, and outputs the hot, high-pressure exhaust gas from the unitary feeder-combustor through second and third ports.

Optionally, the method further includes controlling a magnitude of thrust generated by the rocket motor by either control of a quantity of the powder monopropellant introduced into the unitary feeder-combustor, or by controlling a rotation rate of the rotor, or by both.

In another implementation according to the second aspect, the method further includes using a portion of energy generated by combustion of the powder monopropellant to power at least one of the functions of the rocket motor.

In another implementation according to the second aspect, each particle of the powder monopropellant is comprised of graphene oxide or a derivative thereof as the fuel, and ammonium perchlorate as the oxidizer.

Optionally, the powder monopropellant is a nancomposite bilayer comprised of nano-scale graphene oxide coated around micro-scale particles of the ammonium perchlorate.

DETAILED DESCRIPTION OF THE INVENTION

The present disclosure, in some embodiments, concerns systems and methods for rocket propulsion, including a rocket motor using a powder monopropellant comprised of energetic particles, in which the combustion takes place in a feeder-combustor which is separate from the container that houses the powder monopropellant.

The present disclosure specifically relates to systems and methods for generation of hot, high pressure exhaust for thrust for rocket propulsion. In particular, the generation of hot exhaust gas is performed without combustion of oxygen, optionally in an airless environment, such as in a rocket. The systems for generation of the hot, high-pressure gas include the rocket motor described below, in combination with the powder monopropellant described below. The methods for generation of hot, high-pressure exhaust include combusting the powder monopropellant within the rocket motor, as described below.

Before explaining at least one embodiment of the invention in detail, it is to be understood that the invention is not necessarily limited to the details set forth in the following description and illustrated in the Examples. The invention is capable of other embodiments or of being practiced or carried out in various ways.

As used in the present disclosure, the term "container" refers to a storage tank for monopropellant powder. The term "combustor" refers to a chamber that is used for combustion of the powder monopropellant. The term "feeder" refers to a mechanism for conveying powder monopropellant from the container to the combustor. The term "feeder-combustor" refers to a combination of a feeder mechanism and a combustor, which both moves the powder from the container into the combustor and combusts it. A unitary feeder-combustor is one that combines the two functions into one integrated mechanism, within a single device. A specific example of a unitary feeder-combustor is the TriPort feeder-combustor described herein, which is capable of sucking powder monopropellant therein from the container, such as by vacuum.

Figure 1:
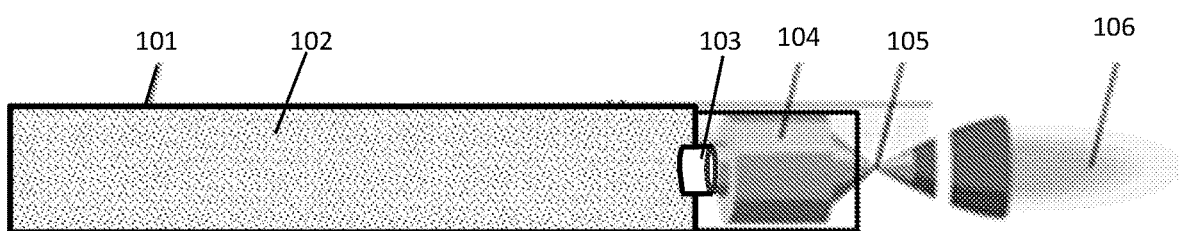
FIG. 1 is a schematic illustration of a rocket propulsion system for combusting a powder monopropellant, according to embodiments of the present disclosure.

FIG. 1 schematically illustrates components of a rocket motor 100, according to embodiments of the present disclosure. Rocket motor 100 includes container 101 for the powder monopropellant 102. Rocket motor 100 further includes a combustor 104, which is separate from the container 101. In advantageous embodiments, the combustor 104 is a unitary feeder-combustor that is capable of drawing a vacuum to thereby suck in the monopropellant powder 102 via inlet 103. The powder monopropellant 102 is combusted in combustor 104. The resulting 106 exhaust is released through nozzle 105.

Although, in the examples described below, each component appears one time, it is to be understood that certain components may be utilized more than once. For example, a multiplicity of separate feeder mechanisms may feed one common combustor 104. Alternatively, a plurality of feeder-combustors 104 may draw powder monopropellant 102 from the same container 101. The multiple feeder-combustors 104 may be used, for example, for redundancy or increased flow. When arranged in the proper configuration, the multiple feeder-combustors may also be used for directional control of the rocket.

Figure 2:
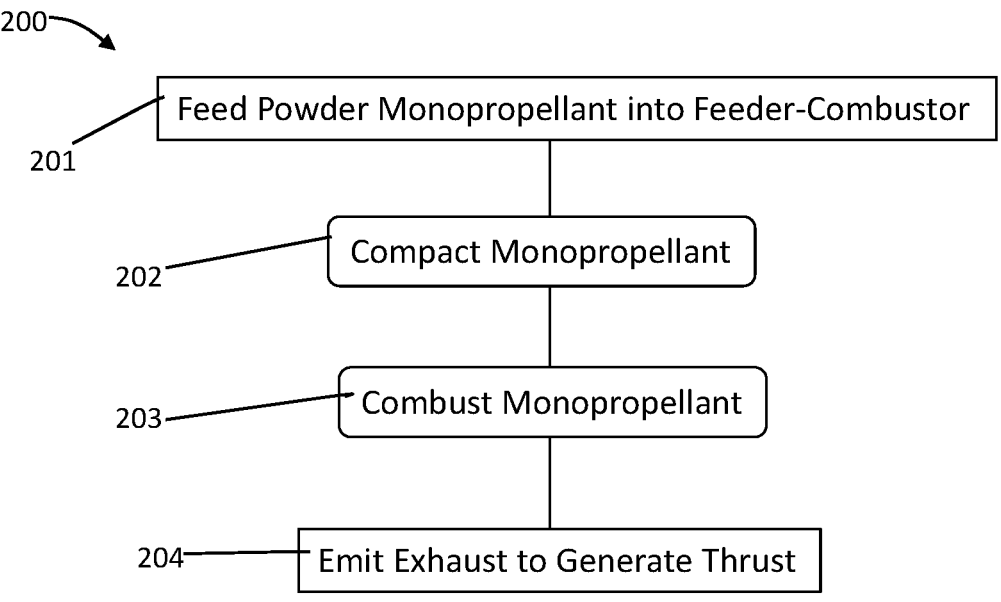
FIG. 2 illustrates steps of a method for feeding and combusting powder monopropellant in a feeder-combustor, according to one specific embodiment of the present disclosure.

FIG. 2 illustrates the steps of operating rocket motor 100. The carrying out of these steps is schematically illustrated in FIGS. 3A-3D on a linear unitary feeder-combustor 300. The linear feeder-combustor 300 is presented highly schematically and may take any specific form that is suitable for performing the functions described herein. Feeder-combustor 300 includes an intake 301 into which powder monopropellant is fed, an exhaust chamber 302, and a nozzle 303 through which exhaust exits the feeder-combustor 300.

Figures 3A, 3B, 3C, 3D:
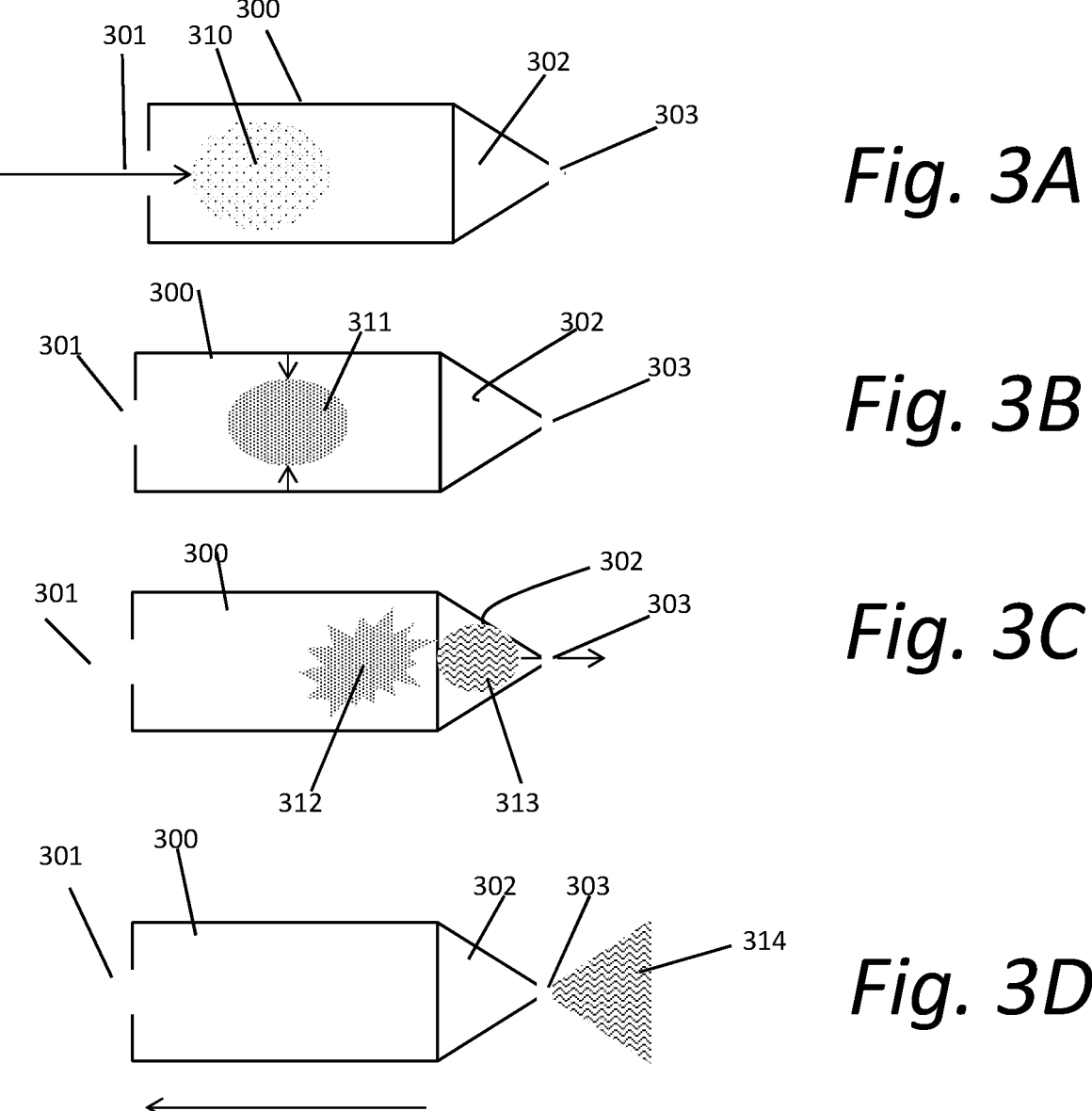
FIGS. 3A-3D illustrate the method of FIG. 2 being performed sequentially in a feeder-combustor, according to one specific embodiment of the present disclosure.
Figure 4:
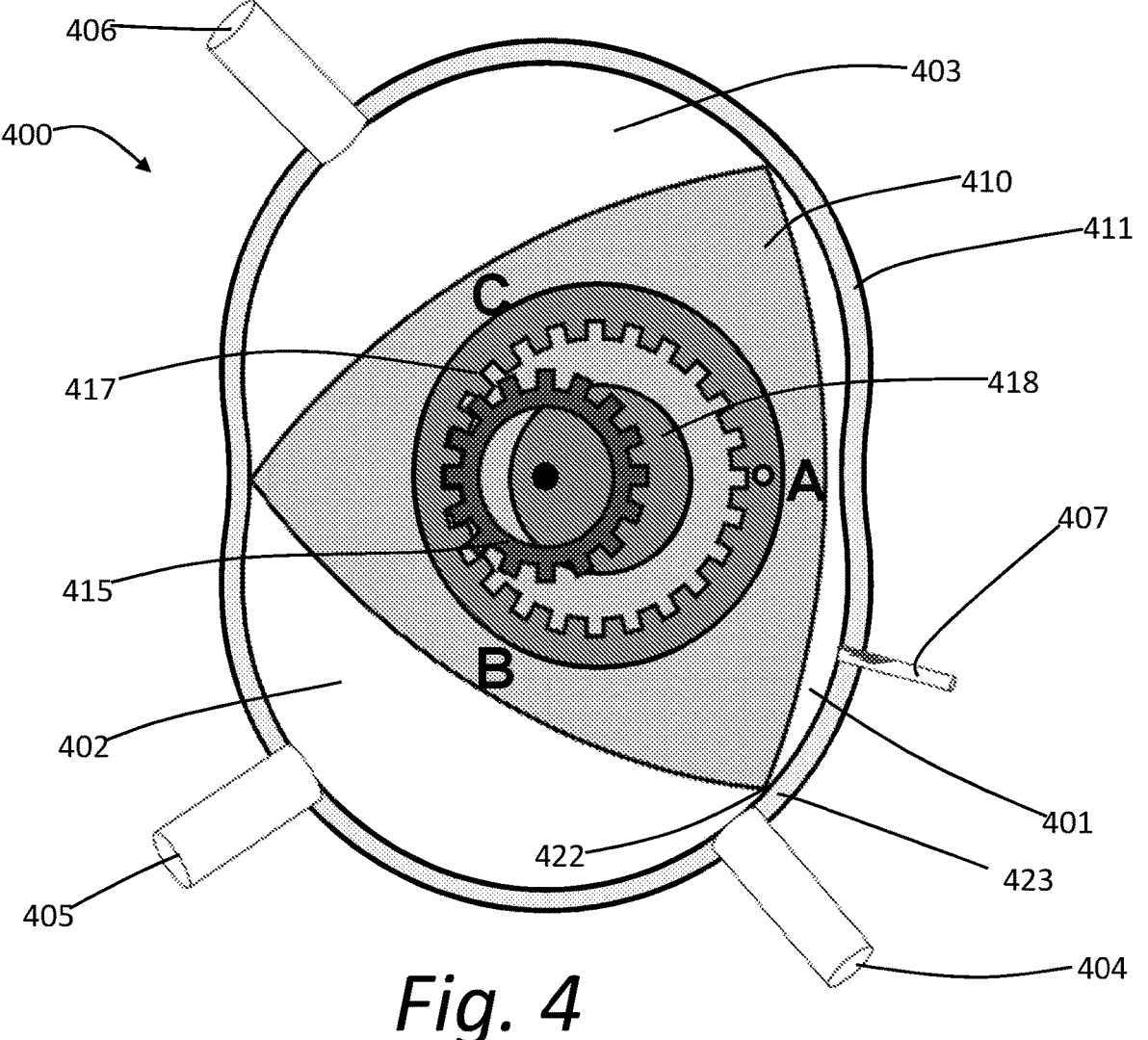
FIG. 4 is a schematic illustration of a TriPort rotary feeder-combustor, according to one possible embodiment of the present disclosure.

At step 201 and in FIG. 3A, the powder monopropellant 102 is fed into the unitary feeder-combustor 300, via intake 301, through operation of a feeder mechanism. For example, in a specific embodiment of the invention, a vacuum may be produced in the feeder-combustor 300, causing the powder monopropellant to be drawn into intake 301. The volumetric density of the powder 310 in the feeder-combustor is reduced, according to the quantity of the powder allowed to be drawn, and the degree of the vacuum produced. At step 202 and in FIG. 3B, the powder monopropellant 311 is compacted, so that the volumetric density of the powder monopropellant 311 is restored (i.e., increased) up to the maximum of its original density 102.

At step 203 and in FIG. 3C, the powder monopropellant is combusted 312 within the feeder-combustor 300. The combustion may be initiated through one or more ignition means known to those of skill in the art, such as with a spark plug, a filament, or a laser. Because the powder monopropellant includes an oxidizer, this combustion is performed without requiring air or another external oxidizer. Typically, the combustion takes place in an airless environment. Hot and high-pressure gas 313 is generated and begins to enter an exhaust chamber 302. Exhaust chamber 302 is equipped with an exhaust tube leading to a nozzle 303 at its opposite end.

At step 204 and in FIG. 3D, exhaust 314 exits the exhaust chamber 302 via nozzle 303. The exit of the exhaust through nozzle 303 produces thrust, thereby propelling the rocket. The thrust generated by the feeder-combustor 300 may be controlled continuously, for example through control of the rate of feeding of the powder monopropellant into the inlet 301. Indeed, it is possible to start and stop the thrust generated by rocket motor 100 at will, through starting and stopping the feeding of powder monopropellant 102 into the feeder-combustor 300. This ability constitutes a vast improvement over current designs of solid propellant rocket motors, which enable starting and stopping of the motor only through separation of the rocket fuel into different stages.

Optionally, a small portion of the energy generated by the combustion is used to power the various functions in the feeder-combustor.

One example of a unitary feeder-combustor suitable for the functions described herein is the TriPort feeder-combustor 400 illustrated in FIGS. 4 and 5A-5I. The TriPort feeder-combustor 400 is comprised of stator housing 411, and a rotor 410 contained within. The rotor 410 is mounted on an eccentric shaft 418 with pinion 415 configured thereon. Rotation of the rotor 410 causes corresponding rotation of crown gear 417 and the eccentric shaft 418. The rotation (clockwise) of the rotor 410 with and around the shaft 418 is such that its apexes (with the corresponding seals) are always in touch with the housing 411, resulting in three separate moving volumes. Volume 401 always faces face A of the rotor 410, even when it rotates; volume 402 always faces face B, and volume 403 always faces face C. In the illustrated position, apex 422 is in touch with corresponding point 423 of the housing 411, and volume 401 is at its lowest potential volume.

TriPort feeder-combustor 400 has three ports. Port 404 is a primary exhaust port. Port 404 includes a unidirectional valve such that the flow through port 404 is always OUT. Port 405 is also an outlet port, which also includes a unidirectional valve, allowing OUT flow only. Port 406 is an inlet port. Port 406 also includes a unidirectional valve such that the flow through this port is always unidirectional-IN.

In the illustrated embodiments, the ignition mechanism 407 is a spark-plug or spark plugs. Other mechanisms are possible.

Operation of the TriPort feeder-combustor 400 is illustrated in FIGS. 5A to 5I. For ease of reference, and in order to emphasize the relative movements of the rotor 410 relative to the stator housing 411, certain of the internal elements of the TriPort feeder-combustor 400 are not shown in FIGS. 5A-5I.

Figures 5A, 5B, 5C, 5D, 5E, 5F, 5G, 5H, 5I:
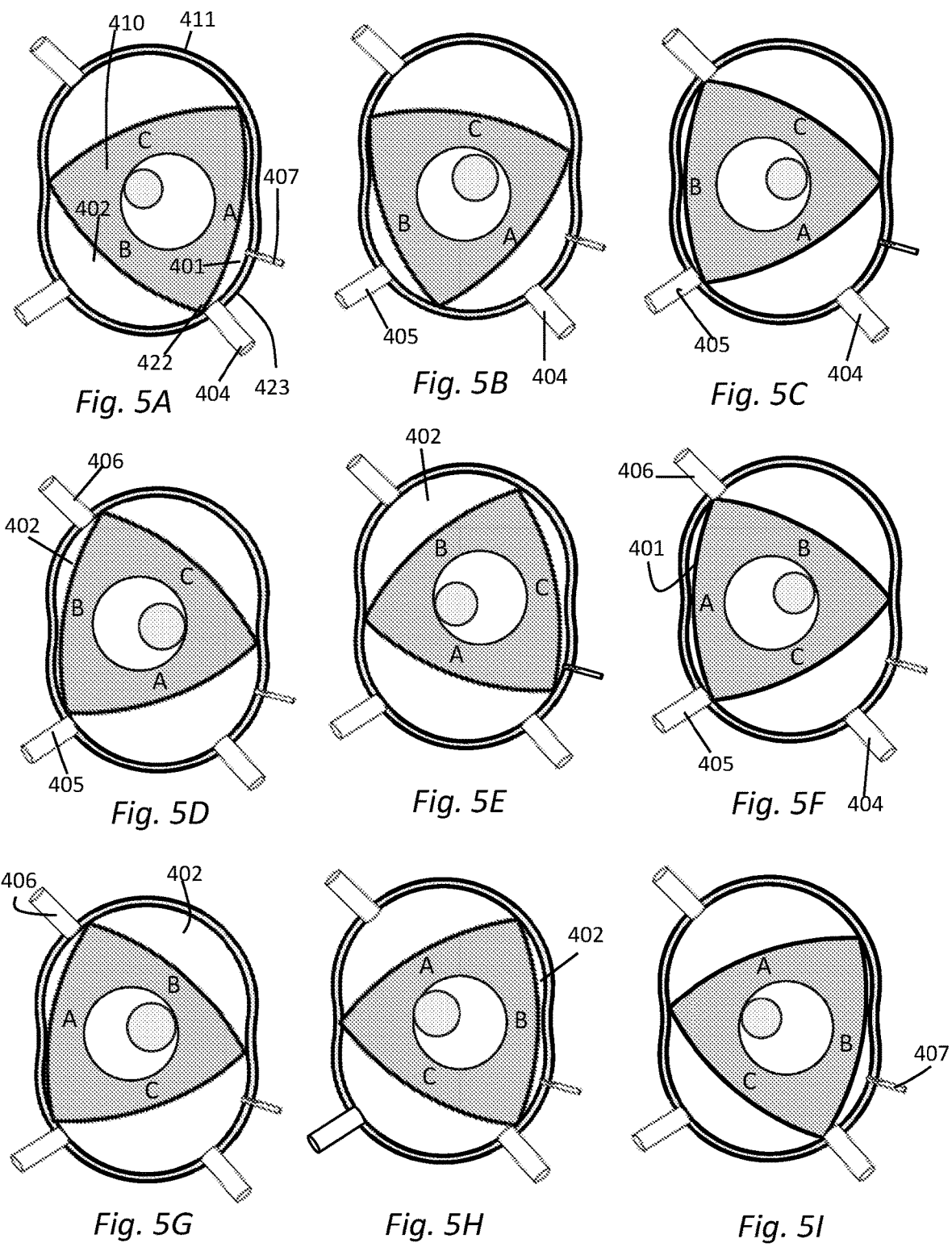
FIGS. 5A through 5I are schematic illustrations of a sequence of stages of the operation of the TriPort feeder-combustor of FIG. 4.

FIG. 5A depicts the rotor 410 in a combustion position. In this position, apex 422 has moved beyond corresponding point 423 of the stator, and is past port 404. Volume 401 opposite face A is slightly larger than its minimum volume, while the volumetric density of the powder (not shown) within volume 401 is close to its maximum value. At that position ignition occurs by ignitor 407. The powder in volume 401 combusts, expands, and produces rotor rotation, to the position depicted in FIG. 5B.

The high pressure, high temperature gas (the result of the combustion) flows out of the outlet port 404 to the exhaust chamber and nozzle. Any gas in volume 402 opposite face B is free to exit through outlet port 405. Almost all the combustion energy is contained in the gas flowing out of port 404. Only a small fraction is needed to move the rotor initially, and even a smaller fraction is needed later, due to the rotor inertia.

In FIG. 5C the rotor position is such that the volume opposite face B is at its minimum, and any gas there was expelled through port 405. Simultaneously, the gas of the combustion in the volume opposite face A continues to flow through port 404 to the exhaust chamber and nozzle.

In FIG. 5D, face B of the rotor 410 moves past intake port 406, and volume 402 opposite face B is expanding, resulting in a vacuum which draws the powder monopropellant from the container into volume 402 opposite face B. Exit port 405 is closed, allowing the intake flow only from port 406.

The rotor's further movement results in the expansion of volume 402 opposite face B, and its filling with a measured quantity of the powder monopropellant, now at a reduced volumetric density compared to the original one in the container. This is depicted in FIG. 5E.

FIG. 5F depicts volume 402 opposite face B at its maximum expansion, with all the measured quantity of the powder monopropellant in it. The volume 401 opposite face A is at its minimal expansion, such that any gases remaining in volume 401 are expelled through port 405.

One advantage of expelling the exhaust sequentially in two ports 404, 405 is to help ensure that a maximum amount of the exhaust is fed to the exhaust chamber by its expulsion from the feeder-combustor in each cycle. Due to the high pressure generated by the combustion, a portion of the exhaust may not exit through port 404. This residual exhaust is compressed as the rotor continues to turn and expelled at the position of FIG. 5F. Furthermore, the complete evacuation of the exhaust gases enables a more efficient utilization of the exhaust, as well as more effective vacuum to form, which thereby draws in more powder monopropellant from port 406 as the rotor continues to turn.

Rotor movement past the position of FIG. 5F, to the position of FIG. 5G, results in volume 402 opposite face B being shut from intake port 406, reduction of its volume and corresponding increase in the volumetric density of the powder monopropellant.

At the position of FIG. 5H, the volume 402 opposite face B is at its minimal value, and the corresponding volumetric density of the monopropellant powder is at its maximum density (up to the original one of the container, or less, as determined by the measured quantity allowed into volume 402 as mentioned above). No compression is allowed or necessary due to the fact that the powder is composed of solid particles.

At the position of FIG. 5I, the position of TriPort feeder-combustor is identical to the position of FIG. 5A, with the rotor having completed ⅔ of a full rotation.

At this position the monopropellant powder is ignited by ignitor 407, and the process repeats itself (see above) with volume 402 opposite face B replacing volume 401 opposite face A, volume 403 opposite face C replacing volume 402 opposite face B, etc.

This continuous process repeats itself 3 times for each rotor revolution, resulting in 3 power strokes for each revolution.

The powder monopropellant is comprised of particles. Each particle contains a combination of an oxidizer particle and a fuel particle in a ratio that is suitable for combustion. In exemplary embodiments, the fuel is graphene oxide (GO) or a derivative thereof, and the oxidizer is ammonium perchlorate (AP). In particular, each particle of the powder monopropellant may be composed of AP and nanoparticles of GO, in relative quantities resulting in an approximate stoichiometric relationship. The term "approximate" is understood to include variations that are typical in preparation of mixtures in stoichiometric ratios, such as, without limitation, variations of up to 10%. In one particularly advantageous embodiment, the fuel in the monopropellant is an epoxy-modified graphene oxide (EMGO). The oxidizer may alternatively be any other suitable oxidizer, such as potassium perchlorate or sodium nitrate.

The powder monopropellant may be prepared according to the methods disclosed in Israeli Patent Application 290, 296, filed Feb. 1, 2022, entitled Burning Rate Enhancement of Solid Propellant for Rocket Motors Using Energetic Formulations Containing Ammonium Perchlorate and High Concentration Graphene Oxide or Epoxy-Modified Graphene Oxide, and Israeli Patent Application 285,325, filed Aug. 2, 2021, entitled "Energetic Formulations Containing Epoxy-Modified Graphene Oxide," the contents of both of which are incorporated by reference as if fully set forth herein. In particular, as set forth in those applications, each particle of the powder monopropellant may be comprised of a nanocomposite bilayer, including a micro-scale particle of ammonium perchlorate, coated by a nano-scale coating of graphene oxide. The powder monopropellant is considered to be "energetic" in the sense that combustion of the powder monopropellant produces an extremely high amount of energy in relation to mass of the powder monopropellant.

Advantageously, the powder monopropellant has, within each particle, both fuel and oxidizer in approximately stoichiometric ratios. All that is necessary is to convey the powder to the combustion chamber, and ignite it.

Further advantageously, composites of AP and GO (or its derivatives, such as EMGO) have an extremely high energy-to-mass ratio. This energy-to-mass ratio is equal or higher than that of typical solid propellants. In addition to having high energy-to-mass ratios, the size of the powder monopropellant particles is expected to make the combustion process very efficient, due to the extremely high surface-area-to-mass of the particles, and the fact that no mixing is required for the combustion to take place.

Using a powder monopropellant accords numerous advantages, even when just considering the powder monopropellant's storage and delivery aspects of the rocket motor. It is not necessary for container 101 to be a heavy, insulated vessel, with capability to withstand high temperatures and high pressures, as in solid propellant rocket motors. Likewise, container 101 need not be a cryogenic fuel tank, with resulting low volumetric efficiency and high drag, as in liquid rocket motors.

Although, in the illustrated embodiments, the powder monopropellant is a composite of GO or a GO derivative and AP, it is envisioned that other monopropellant powders may be incorporated into the rocket motor described herein. For example, the powder monopropellant may be a pyrotechnic powder or a derivative of black powder.

What is claimed is:

1. A system for generating hot, high-pressure exhaust gas for thrust, comprising:

a powder monopropellant, wherein each particle of powder is comprised of a combination of oxidizer and fuel in a ratio suitable for combustion; and a rocket motor for combusting the monopropellant, said rocket motor comprising a container for storing the monopropellant, and a combustor, wherein the combustor is configured to feed the powder monopropellant from the container and to combust the powder monopropellant therein without consumption of atmospheric air, thereby generating hot, high-pressure exhaust gas, generating thrust.

2. The system of claim 1, wherein the combustor sucks the powder monopropellant from the container with a vacuum.

3. The system of claim 1, wherein the combustor comprises a rotor within a stator housing which rotates to cyclically suck in powder monopropellant into the combustor from a first port, exposes the powder monopropellant to an ignition source within the combustor to thereby ignite the powder monopropellant, and outputs the hot and high-pressure exhaust gas from the combustor through second and third ports.

4. The system of claim 3, wherein a magnitude of thrust generated by the rocket motor is controllable by either control of a quantity of the powder monopropellant introduced into the combustor, or by controlling a rotation rate of the rotor, or by both.

5. The system of claim 1, wherein said rocket motor is configured to use a portion of energy generated by combustion of the powder monopropellant to power the rocket motor.

6. The system of claim 1, further comprising a plurality of separate combustors, drawing the powder monopropellant from the same container.

7. The system of claim 1, wherein each particle of the powder monopropellant is comprised of graphene oxide or a derivative thereof as the fuel, and ammonium perchlorate as the oxidizer.

8. The system of claim 7, wherein the powder monopropellant is a nanocomposite bilayer comprised of nano-scale graphene oxide coated around micro-scale particles of the ammonium perchlorate.

9. A method of generating hot, high-pressure gas exhaust from a rocket motor to thereby generate thrust, comprising:

introducing powder monopropellant particles into a container, the powder monopropellant particles each comprising a combination of oxidizer and fuel in a ratio suitable for combustion;

moving the powder monopropellant from the container into a combustor; and combusting the powder monopropellant within the combustor without consumption of atmospheric air, thereby generating hot, high-pressure, exhaust gas, generating thrust.

10. The method of claim 9, wherein the moving step comprises sucking the powder monopropellant from the container into the combustor with a vacuum.

11. The method of claim 9, wherein the combustor comprises a rotor within a stator housing which rotates to cyclically suck in powder monopropellant into the combustor from a first port, exposes the powder monopropellant to an ignition source within the combustor to thereby ignite the powder monopropellant, and outputs the hot, high-pressure exhaust gas from the combustor through second and third ports.

12. The method of claim 11, further comprising controlling a magnitude of thrust generated by the rocket motor by either control of a quantity of the powder monopropellant introduced into the combustor, or by controlling a rotation rate of the rotor, or by both.

13. The method of claim 9, further comprising using a portion of energy generated by combustion of the powder monopropellant to power the rocket motor.

14. The method of claim 9, wherein each particle of the powder monopropellant is comprised of graphene oxide or a derivative thereof as the fuel, and ammonium perchlorate as the oxidizer.

15. The method of claim 14, wherein the powder monopropellant is a nancomposite bilayer comprised of nano-scale graphene oxide coated around micro-scale particles of the ammonium perchlorate.

* * * * *